United States Patent [19]

Kittl et al.

[11] Patent Number: 4,910,003
[45] Date of Patent: Mar. 20, 1990

[54] PROCESS FOR SELECTIVE REMOVAL AND DESTRUCTION OF HYDROGEN CYANIDE FROM NITROUS-CONTAINING GASES

[75] Inventors: Walter Kittl, Linz; Gerhard Stern, Sonnberg, both of Austria

[73] Assignee: Chemie Linz Gesellschaft m.b.H., Linz, Austria

[21] Appl. No.: 348,839

[22] Filed: Apr. 8, 1989

[30] Foreign Application Priority Data

May 13, 1988 [AT] Austria ............................ A 1247/88

[51] Int. Cl.$^4$ ............................................. B01D 53/34
[52] U.S. Cl. ................................................... 423/236
[58] Field of Search ....................... 423/236, 372, 374; 55/68; 588/1284 H

[56] References Cited

U.S. PATENT DOCUMENTS

| | | | |
|---|---|---|---|
| 2,747,962 | 5/1956 | Heitz et al. | 423/236 |
| 4,094,958 | 6/1978 | Miller | 423/238 |
| 4,477,420 | 10/1984 | Bauer et al. | 423/234 |

FOREIGN PATENT DOCUMENTS

| | | | |
|---|---|---|---|
| 279003 | 8/1988 | European Pat. Off. | 423/236 |
| 1121268 | 7/1962 | Fed. Rep. of Germany . | |
| 2531721 | 2/1976 | Fed. Rep. of Germany | 423/236 |
| 2531720 | 5/1976 | Fed. Rep. of Germany . | |
| 3327592 | 2/1985 | Fed. Rep. of Germany . | |
| 61-97114 | 5/1986 | Japan . | |
| 1533917 | 11/1978 | United Kingdom . | |
| 1544317 | 4/1979 | United Kingdom . | |
| 1576067 | 10/1980 | United Kingdom . | |

Primary Examiner—Jeffrey E. Russel
Assistant Examiner—Brian M. Bolan
Attorney, Agent, or Firm—Mark Dryer

[57] ABSTRACT

Process for selective removal and destruction of hydrogen cyanide contained in nitrous gases, in which the nitrous-containing gases are washed with nitric acid in counter-current in an absorption column and the nitric acid charged with hydrogen cyanide is regenerated at elevated temperature, with simultaneous hydrolysis and oxidation of the hydrogen cyanide.

5 Claims, 1 Drawing Sheet

PROCESS FOR SELECTIVE REMOVAL AND DESTRUCTION OF HYDROGEN CYANIDE FROM NITROUS-CONTAINING GASES

BACKGROUND OF THE INVENTION

The invention relates to a process for selective removal and destruction of hydrogen cyanide (HCN) from a mixture with nitrous-containing gases.

On oxidation of alkylated aromatics with nitric acid, in addition to nitrous gases HCN also forms in the waste gas. The nitrous gases NO and $NO_2$ can be used for production of nitric acid, but HCN must first be removed from the waste gas. A number of processes are known for removal of HCN from waste gases of different compositions. A process for washing $NH_3$, $H_2S$ and HCN out of gases by means of iron(II) salt solutions containing sulphuric acid is thus known from DE-PS No. 1,121,268. This gas washing is carried out in three stages at increasing pH values, corresponding partly insoluble salts which must subsequently be disposed of being formed in each case with the gas constituents. It is furthermore known from DE-OS NO. 3,327,592 that HCN can be removed from gas mixtures via an active charcoal fixed bed catalyst charged with sulphur, thiocyanates being formed. The purification of the catalyst contaminated with thiocyanates and disposal of these thiocyanates is not described. The possibility of removing HCN from acid waste gases, which also contain $H_2S$, $SO_2$ and $CO_2$, by alkaline absorption is furthermore known from U.S. Pat. No. 2,747,962. Salts which must in turn be disposed of are formed here.

The object of the present invention was thus to discover a process in which HCN can be removed from nitrous-containing waste gases so that no products which subsequently had to be disposed of are obtained. This was to be achieved by a simple process in which HCN is removed from the waste gas by washing this with nitric acid in counter-current, so that the NO— and NO—$_2$-containing waste gas which remains can be processed quantitatively to give nitric acid. The HCN absorbed by the nitric acid is then hydrolyzed and oxidized during regeneration of the washing acid at elevated temperature.

SUMMARY OF THE INVENTION

The invention accordingly relates to a process for the selective removal and destruction of hydrogen cyanide from a mixture containing said hydrogen cyanide in admixture with nitrous gases, which comprises washing said mixture with nitric acid in counter-current fashion in an absorption column and regenerating the nitric acid charged with hydrogen cyanide at a temperature of about 50° C. up to the boiling point of said mixture under normal pressure or under pressure with simultaneous hydrolysis and oxidation of the hydrogen cyanide.

To carry out the process according to the invention, the waste gas from the nitric acid oxidation is first washed with nitric acid in counter-current. The temperature here is above the melting point and below the boiling point of nitric acid. However, the absorption is preferably carried out at temperatures between 0° C. and 30° C. The absorption can be carried out under normal pressure or under pressure, preferably under the pressure of the preceding oxidation with nitric acid, for example under 1–25 bar. The concentration of the washing acid can vary within a wide range. However, in order to guarantee rapid regeneration of the washing acid charged with HCN, the concentration of the nitric acid should preferably be 20% by weight to 65% by weight. That concentration which is also employed for the nitric acid oxidation is preferably used.

If the waste gas from the nitric acid oxidation to be purified has a low degree of oxidation, that is to say a high content of NO, it is advantageous to oxidize the NO at least partly before the absorption, by feeding in air, since otherwise some of the washing acid employed is consumed for further oxidation of the NO and the subsequent regeneration then proceeds more slowly.

After the absorption, the washing acid charged with HCN is heated continuously or discontinuously to a temperature of about 50° C. up to the boiling point of the mixture under normal pressure or under pressure. The dissolved HCN is in this way hydrolyzed and oxidized and NO, $NO_2$, $CO_2$ and $NH_3$ formed. The NO and $NO_2$ can be reacted again quantitatively to give nitric acid. The temperature at which the regeneration is carried out is chosen according to the residence time available in the regeneration kettle and the permitted residual concentration of HCN in the nitric acid. The higher the temperature chosen, the faster the regeneration proceeds.

DETAILED DESCRIPTION OF INVENTION

Figure 1:
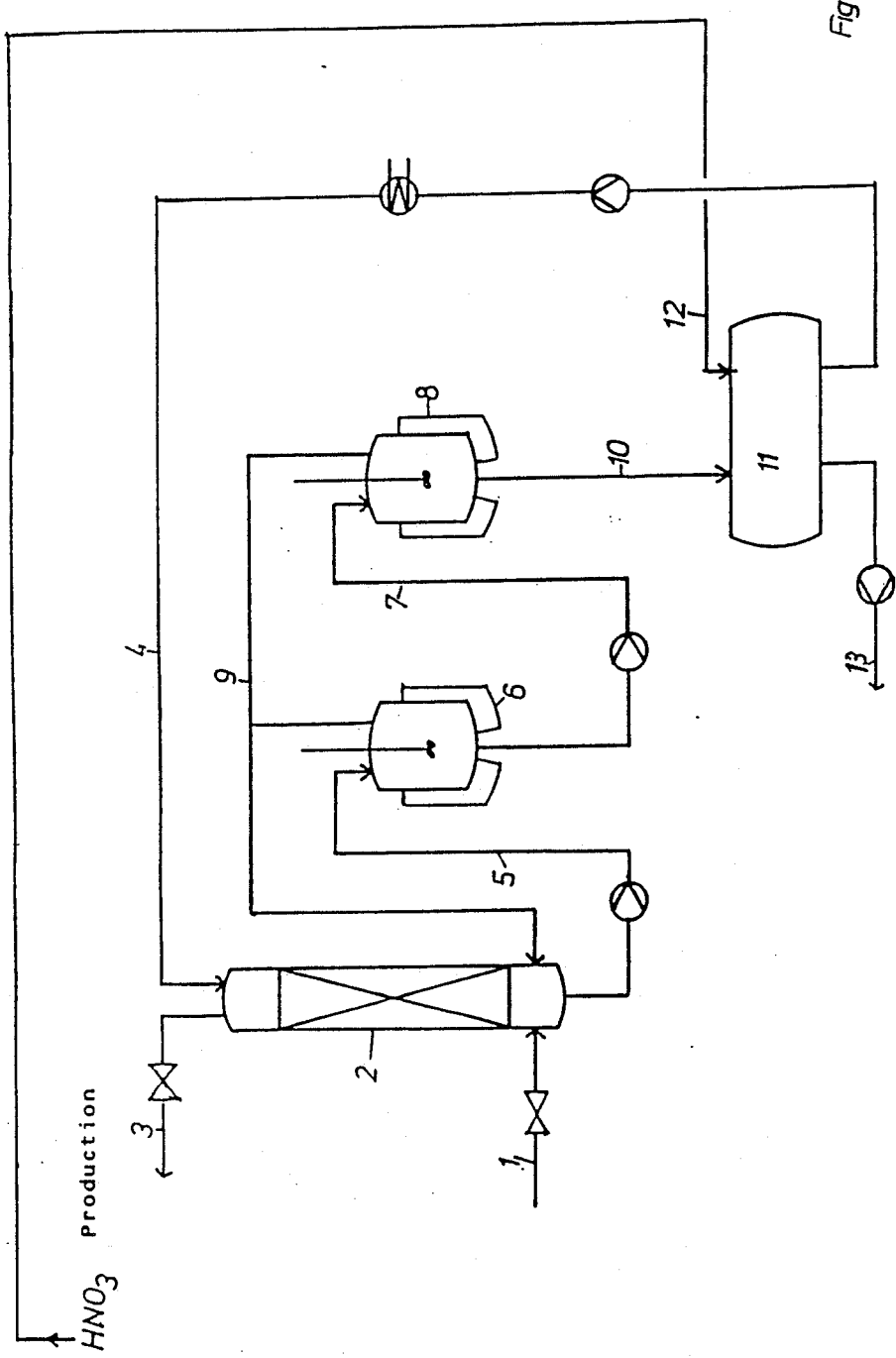
FIG. 1 shows one possibility of carrying out the process according to the invention in a continuous procedure. The waste gas from the nitric acid oxidation is passed via a line 1 to the bottom of the washing column 2. Nitric acid is introduced via line 4 at the top of the column, and reacts with the waste gas in counter-current.

The washed gas leaves the column via line 3 and is passed to the nitric acid production. The nitric acid charged with HCN is removed at the bottom of the washing column via line 5 and pumped into a first regeneration kettle 6 and then via line 7 into a second regeneration kettle 8. The nitric acid is stirred at the desired regeneration temperature in regeneration kettles 6 and 8, the filling level being kept as constant as possible. The gas formed in the regeneration kettles by degradation of the HCN is recycled via line 9 to the bottom of the absorption column 2. The purified nitric acid is passed from the regeneration kettle 8 via line 10 into a storage tank 11, where the nitric acid consumed is replaced by fresh acid (line 12). The nitric acid from the storage tank can be employed, via line 13, for the oxidation or pumped via line 4 through a heat exchanger into the absorption column as the washing acid.

The process according to the invention can also be carried out discontinuously, but the continuous procedure is preferred. The residual concentration of HCN in the waste gas from the absorption column depends on the number of theoretical plates of the column, the absorption temperature, the absorption pressure and the amount of nitric acid employed and its degree of charging with hydrogen cyanide. The higher the number of plates, absorption pressure and amount of nitric acid employed and the lower the absorption temperature and degree of charging of the nitric acid with hydrogen cyanide, the lower the residual concentration of HCN in the recycled gas. The permitted residual concentration of HCN is determined by the nitric acid production, concentrations of about 300 ppm being entirely acceptable. With a suitable design of the absorption column, HCN is no longer detectable in the waste gas.

The degradation of the hydrogen cyanide in the washing acid is all the more complete, the higher the number and volume of regeneration kettles, since as the number and volume increases, a longer residence time of contaminated acid in the kettles results. The higher the regeneration temperature and the higher the concentration of the nitric acid, the more complete the degradation of the HCN.

EXAMPLE 1

The waste gas from an oxidation of alkylated aromatics with nitric acid having a volume flow of 10 m³/h and an average hydrogen cyanide content of 10,000 ppm was washed with 60% strength by weight nitric acid in a packed column with 3 theoretical plates. 50 l of 60% strength by weight $HNO_3$/h were passed in at the top of the column. The absorption was carried out at a temperature of 25° C. under a pressure of 9 bar. The nitric acid removed at the bottom of the absorption column contained on average 2,000 ppm of HCN and was regenerated in two regeneration kettles, each with a volume of 400 l, at a temperature of 100° C. while stirring.

The content of HCN in the gas from the absorption column was below the detection limit (detection limit 10 ppm), and the regenerated nitric acid contained 1 ppm of HCN.

EXAMPLES 1–6

The selective removal of HCN under various conditions, as shown in Table 1, was carried out analogously to Example 1. The results are shown in Table 2.

TABLE 1

| | Absorption (A) and regeneration (R) conditions | | | | | |
|---|---|---|---|---|---|---|
| Example No. | p(bar) (A,R) | C($HNO_3$) % by weight | V($HNO_3$) l/h | V (waste gas) m³/h | T(A) °C. | T(R) °C. |
| 1 | 9 | 60 | 50 | 10 | 25 | 100 |
| 2 | 4 | 60 | 75 | 15 | 25 | 100 |
| 3 | 9 | 60 | 50 | 10 | 25 | 80 |
| 4 | 4 | 60 | 50 | 10 | 25 | 50 |
| 5 | 4 | 40 | 75 | 15 | 25 | 100 |
| 6 | 4 | 20 | 75 | 15 | 25 | 100 |

TABLE 2

| | Content of HCN in ppm | | | |
|---|---|---|---|---|
| | in the gas | | in the $HNO_3$ | |
| Example No. | before absorption | after absorption | before regeneration | after regeneration |
| 1 | 10,000 | below detection limit | 2,000 | 1 |
| 2 | 8,000 | 20 | 1,600 | 2 |
| 3 | 10,000 | 12 | 2,000 | 25 |
| 4 | 5,000 | 140 | 1,200 | 180 |
| 5 | 10,000* | 38 | 2,000 | 20 |
| 6 | 10,000 | 500 | 2,600 | 680 |

What we claim is:

1. A process for the selective removal and destruction of hydrogen cyanide from a mixture containing said hydrogen cyanide in admixture with nitrous gases, which comprises washing said mixture with nitric acid in counter-current fashion in an absorption column and regenerating the nitric acid charged with hydrogen cyanide at a temperature of about 50° C. up to the boiling point of said mixture under normal pressure or under pressure, with simultaneous hydrolysis and oxidation of the hydrogen cyanide.

2. Process according to claim 1, characterized in that the absorption is carried out at temperatures between 0° and 30° C. under a pressure of 1–25 bar.

3. Process according to claim 1, characterized in that the nitric acid charged with HCN is regenerated at temperatures between 50° and 120° C.

4. Process according to claim 1, characterized in that the concentration of the nitric acid is kept between 20 and 65% by weight.

5. Process according to claim 1, characterized in that it is carried out continuously.

* * * * *